(12) United States Patent
Takada et al.

(10) Patent No.: US 8,342,856 B2
(45) Date of Patent: Jan. 1, 2013

(54) CHARGING CONNECTOR AND METHOD

(75) Inventors: Akinori Takada, Yokkaichi (JP);
Toshifumi Ichio, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 118 days.

(21) Appl. No.: 13/026,337

(22) Filed: Feb. 14, 2011

(65) Prior Publication Data
US 2011/0207368 A1  Aug. 25, 2011

(30) Foreign Application Priority Data
Feb. 19, 2010 (JP) ................................ 2010-034832

(51) Int. Cl.
*H01R 33/00* (2006.01)
(52) U.S. Cl. .......................... 439/34; 439/246; 439/519
(58) Field of Classification Search .................... 439/34, 439/35, 246, 271, 275, 519
See application file for complete search history.

(56) References Cited

U.S. PATENT DOCUMENTS

| | | |
|---|---|---|
| 5,458,496 A | 10/1995 | Itou et al. |
| 5,556,284 A | 9/1996 | Itou et al. |
| 5,577,920 A | 11/1996 | Itou et al. |
| 5,584,712 A | 12/1996 | Fukushima |
| 5,637,977 A | 6/1997 | Saito et al. |
| 5,816,643 A | 10/1998 | Itou et al. |
| 8,206,171 B2 * | 6/2012 | Osawa et al. ................. 439/352 |

\* cited by examiner

*Primary Examiner* — Khiem Nguyen
(74) *Attorney, Agent, or Firm* — Gerald E. Hespos; Michael J. Porco

(57) ABSTRACT

A charging connector (10) has terminal fittings (20) including female-side main portions (21) connectable to a vehicle-side terminal (60) and having a wire (W) connected to the rear end of the main portion (21). Terminal accommodating portions (15) are formed internally with cavities (17) for accommodating the terminal fittings (20). Seals (30) are sandwiched between facing inner walls of the cavities (17) and the main portions (21). Wire accommodating portions (11, 12) are behind the terminal accommodating portions (15) for accommodating the wires (W) in a state where reaction forces push the terminal fittings (20) forward. Each terminal fitting (20) is biased constantly forward by the reaction force of the wire W against a frictional force with the seal ring (30), thereby being arranged at a frontmost position where the front end of the main portion (21) and a front wall (17A) of the cavity (17) are in contact.

9 Claims, 7 Drawing Sheets

CHARGING CONNECTOR AND METHOD

BACKGROUND OF THE INVENTION

1. Field of the Invention

The invention relates to a charging connector connectable to a vehicle-side connector in a vehicle.

2. Description of the Related Art

U.S. Pat. No. 5,637,977 and FIG. 7 herein disclose a known charging connector connectable to a vehicle-side connector in a vehicle. With reference to FIG. 7, this connector includes a terminal fitting 1 connectable to a vehicle-side terminal in the vehicle-side connector. The terminal fitting 1 is accommodated in a cavity 2 in a terminal accommodating portion 3. The terminal fitting 1 has a tubular main portion 4 connectable to the vehicle-side terminal, and a flange 5 that projects from the outer peripheral surface of the tubular main portion 4. On the other hand, the cavity 2 has an open rear end, and the terminal fitting 1 is inserted forward through the open rear end. The flange 5 contacts a rear end opening edge 6 of the cavity 2 when the terminal fitting 1 is accommodated into the cavity 2 to prevent the terminal fitting 1 from moving any further forward.

The charging connector is used outdoors. Thus, a muddy water test is conducted in which the charging connector is immersed in muddy water, dried and then repeatedly connected to and separated from the vehicle-side connector. Thus, the charging connector is required to have durability for the muddy water test.

A clearance 9 is formed between a front end 7 of the main portion 4 and a front wall 8 of the cavity 2 when the flange 5 stops the terminal fitting 1 at its front end position, and muddy water or the like can enter the clearance 9. A water drain hole can be formed below the clearance 9 at the lower side of the front end of the cavity 2 to drain the muddy water to the outside. However, the muddy water cannot be drained efficiently to the outside of the cavity 2 since surface tension acts on the muddy water. Dried muddy water creates mud deposits on a contact portion between the terminal fitting 1 and the vehicle-side terminal. Thus, if the connector is connected and separated repeatedly, plating of the contact portion may be peeled off or terminal surfaces may be scratched.

The invention was developed in view of the above situation and an object thereof is to efficiently drain muddy water to the outside of a cavity.

SUMMARY OF THE INVENTION

The invention relates to a charging connector connectable to a vehicle-side connector of a vehicle. The charging connector includes a terminal fitting with a main portion connectable to a vehicle-side terminal in the vehicle-side connector and having an end of a wire connected to the main portion. The connector also includes a terminal accommodating portion internally formed with a cavity for accommodating the terminal fitting, a seal to seal the terminal fitting, and a wire accommodating portion behind the terminal accommodating portion for accommodating the wire in a state where a reaction force capable of pushing the terminal fitting forward is produced. The terminal fitting is constantly biased forward by the reaction force of the wire against a frictional force with the seal. Accordingly, a clearance at the front of the cavity is eliminated, thereby preventing entry of muddy water and protecting terminal surfaces.

The seal preferably is sandwiched between facing surfaces of an inner wall of the cavity and the main portion to seal between the facing surfaces over the entire circumference.

The terminal fitting preferably is biased constantly forward by the reaction force of the wire against a frictional force with the seal. Thus, the terminal fitting is at a frontmost position with the front end of the main portion contacting the front wall of the cavity.

The charging connector may further comprise a retainer provided behind the terminal accommodating portion for engaging an outwardly projecting flange of the terminal fitting from behind to retain the terminal fitting in the cavity.

In a state where the vehicle-side terminal is fit in the main portion, the terminal fitting may be arranged at a rearmost position where the flange and the retaining portion are engaged. Accordingly, the engagement of the flange with the retainer prevents the terminal fitting from coming out backward by.

The main portion may include at least one contact piece that resiliently contacts the vehicle-side terminal. The vehicle-side terminal and the contact piece may slide as the vehicle-side terminal and the main portion are connected and separated. Accordingly, a wiring effect can be displayed by sliding movements of the vehicle-side terminal and the contact piece. In other words, dust or like deposits on the terminal surfaces can be wiped off by the wiping effect.

The terminal fitting may be movable back and forth between the frontmost position and the rearmost position while being connected to and separated from the vehicle-side terminal. For example, if the retainer is formed so that the leading end of the retainer is pivotally displaceable, the retainer is pushed by the flange and the leading end of the retainer is displaced along its pivot path when the terminal fitting is accommodated into the cavity. The leading end of the retainer returns along its pivot path when the flange moves beyond the retainer. The leading end of the retainer moves away from the flange along its pivot path during a returning movement and a tiny clearance is formed between the flange and the leading end of the retainer. In other words, the terminal fitting needs to be movable back and forth at the very least by as much as the clearance to allow the retainer to return. In this respect, the terminal fitting is movable back and forth between the frontmost position and the rearmost position. Therefore the clearance can be ensured and the retainer can reliably return.

A frictional force between the vehicle-side terminal and the main portion may be larger than the reaction force received from the wire.

The frictional force of the seal may be adjusted by an oil or lubricant content amount thereof.

The present invention is preferably embodied as follows.

These and other objects, features and advantages of the invention will become more apparent upon reading the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
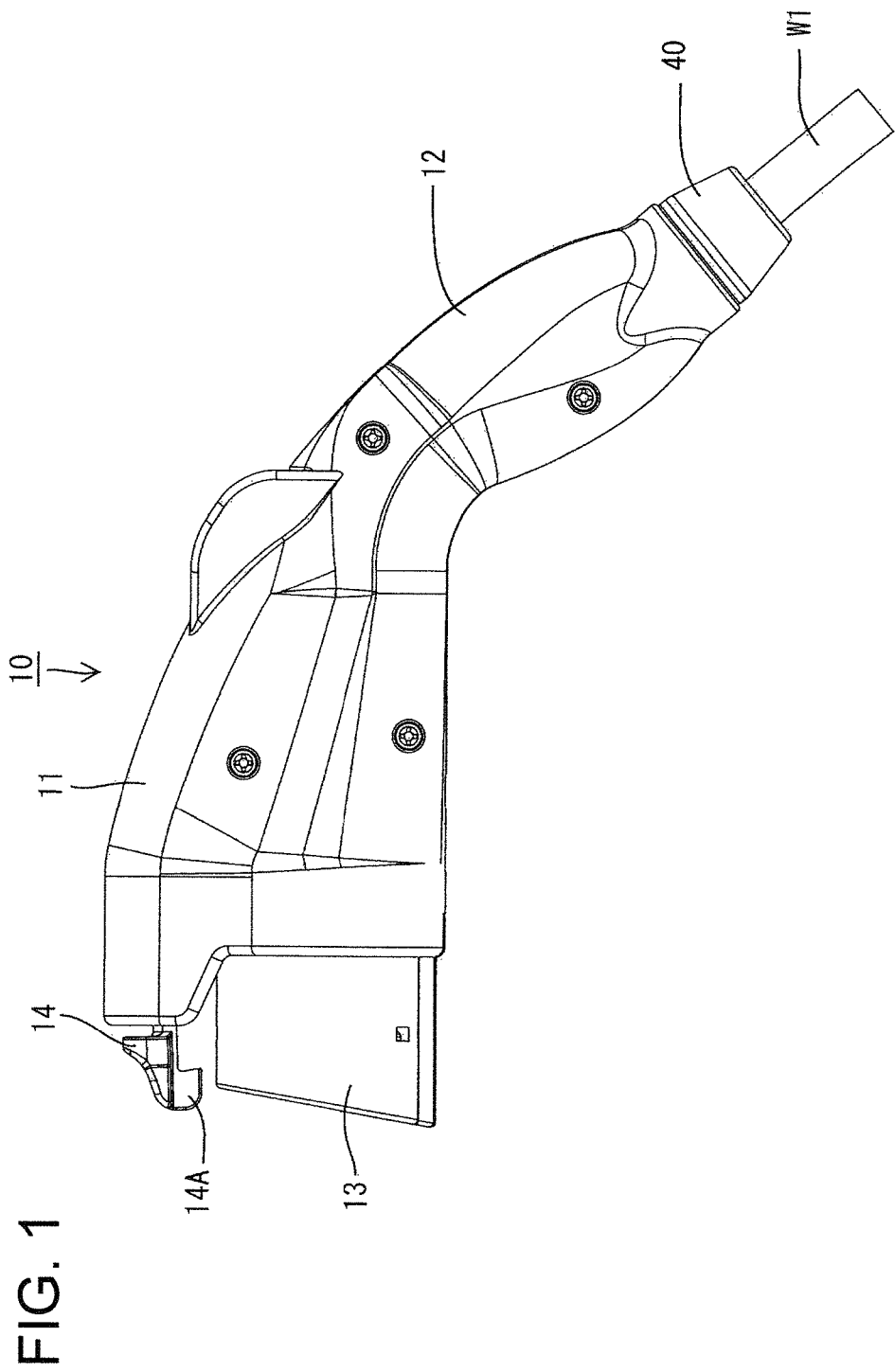
FIG. 1 is a side view of a charging connector according to an embodiment.
Figure 2:
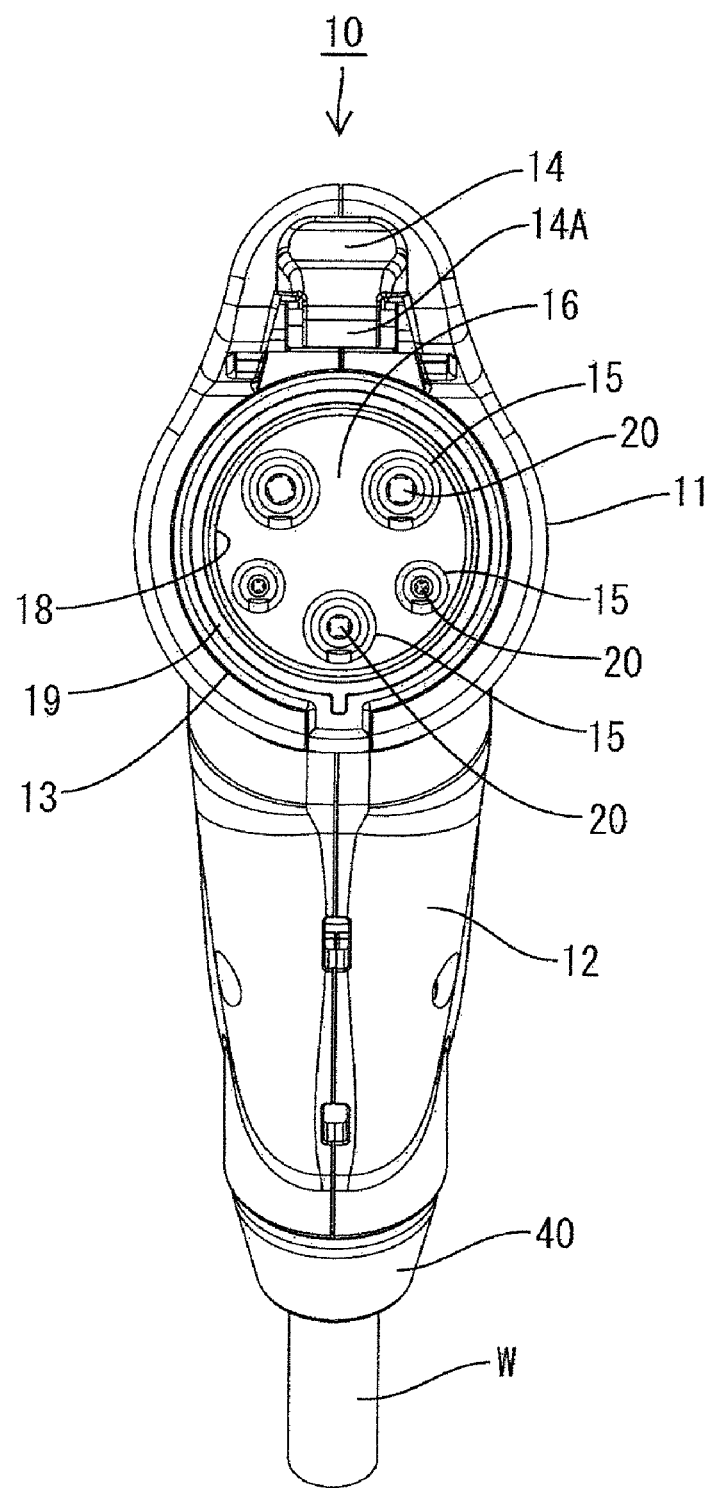
FIG. 2 is a front view of the charging connector.

A charging connector in accordance with the invention is identified by the numeral 10 in FIGS. 1 to 6. The charging connector 10 is connectable with a vehicle-side connector 50. Front and forward are used herein refer to a connection direction of the charging connector 10 with the vehicle-side connector 50. The charging connector 10 is substantially gun-shaped and has a connector main body 11 at a front portion and a grip 12 extending obliquely down from a rear part of the connector main body 11, as shown in FIG. 1. The connector main body 11 and the grip 12 both are made of synthetic resin and unitarily molded. A substantially tubular receptacle 13 projects forward from the front of the connector main body 11. A lever 14 is mounted at an upper side of the interior of the connector main body 11 and a front end of the lever 14 is exposed to the outside from the front of the upper surface of the connector main body 11. As shown in FIG. 2, the connector main body 11 has an outer peripheral shape in conformity with the outer circumferential surface of the receptacle 13 and a part thereof corresponding to the lever 14 projects out and up.

Figure 3:
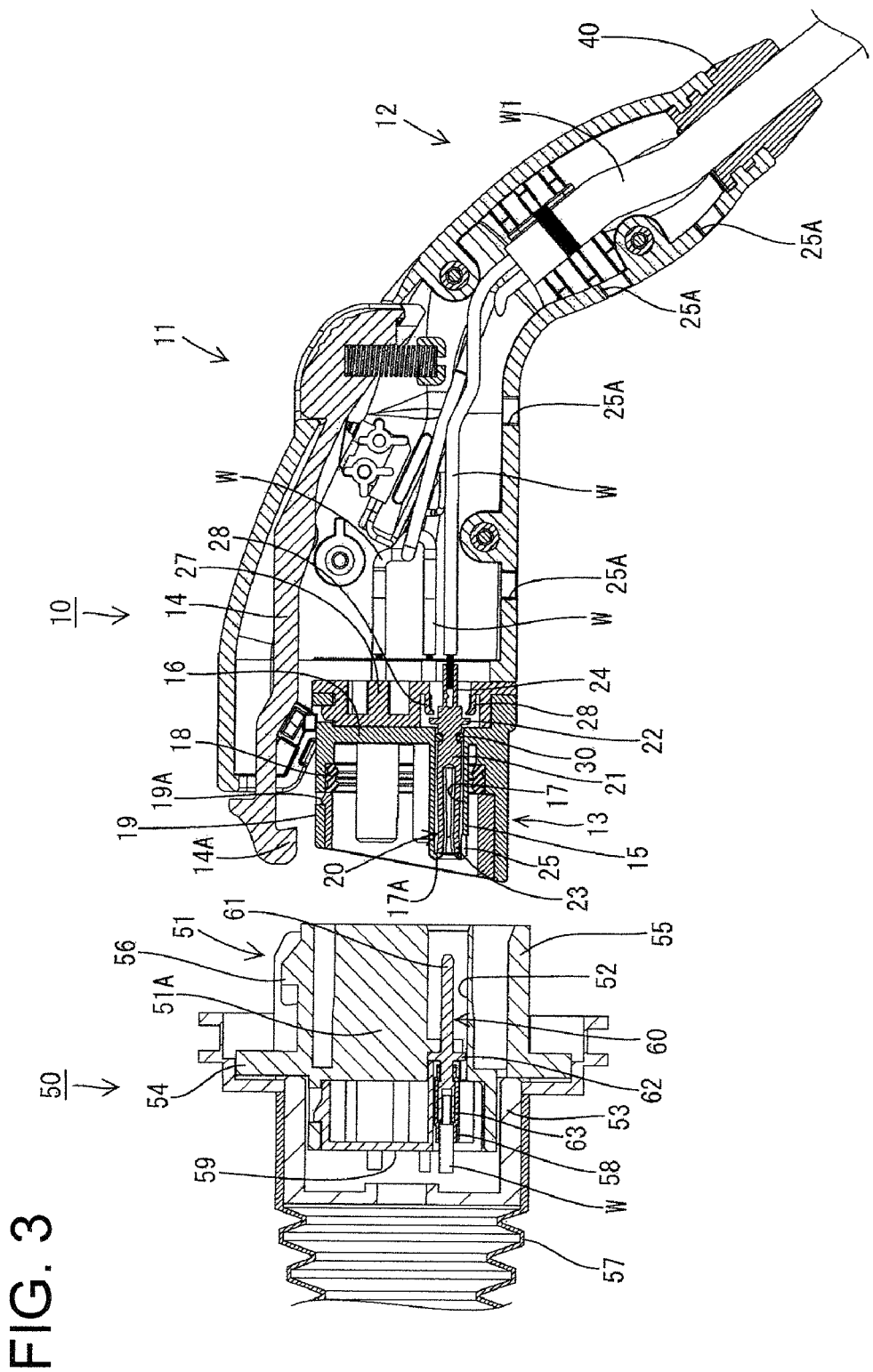
FIG. 3 is a section showing a state before a vehicle-side connector and the charging connector are connected.

As shown in FIG. 3, the receptacle 13 is formed as a separate member from the connector main body 11, and is mounted to the connector main body 11 by an unillustrated locking means. Cylindrical terminal accommodating portions 15 are provided in the receptacle 13 and project forward from a back wall 16 of the receptacle 13. Cavities 17 are formed in the terminal accommodating portions 15 for accommodating terminal fittings 20.

Each cavity 17 is open at the rear surface of the back wall 16 of the receptacle 13 and defines a space for accommodating the terminal fitting 20. This space is formed by the inner wall of the terminal accommodating portion 15. On the other hand, a front wall 17A of the cavity 17 can contact the front end of the terminal fitting 20 inserted forward through the rear end opening of the cavity 17 to prevent the terminal fitting 20 from moving any further forward. An insertion hole penetrates the front wall 17A of the cavity 17 and can receive a vehicle-side terminal 60 to be described later. Further, at least one water drain hole 25 penetrates through a lower side of the front end of the inner wall of the cavity 17. Water that enters the cavity 17 may be drained to the outside through the at least one water drain hole 25.

A cylindrical rubber ring 18 is mounted along the inner circumferential surface of the receptacle 13 in the receptacle 13, and a holder 19 is mounted before the rubber ring 18 for retaining the rubber ring 18. The holder 19 has substantially the same cylindrical shape as the rubber ring 18 and includes at least one lock 19A that engages the inner side of the receptacle 13 to mount the holder 19 along the inner surface of the receptacle 13.

A mounting portion for the holder 19 on the inner circumferential surface of the receptacle 13 has a larger diameter than the back side of the holder 19. The inner circumferential surface of the holder 19 and the inner circumferential surface of the receptacle 13 behind the rubber ring 18 are substantially flush when the holder 19 is mounted. Lips of the rubber ring 18 project radially inward of the inner circumferential surface of the holder 19. On the other hand, the vehicle-side connector 50 includes a vehicle-side housing 51 connectable to the charging connector 10. The vehicle-side housing 51 is made of synthetic resin and includes a housing main body 51A that can fit into the receptacle 13. Thus, when the housing main body 51A is fit into the receptacle 13, the outer circumferential surface of the housing main body 51A closely contacts the lips of the rubber ring 18 to provide waterproofing between the two connectors 10 and 50.

Vehicle-side cavities 52 are formed in the housing main body 51A for accommodating vehicle-side terminals 60. The vehicle-side housing 51 is mounted in a mounting opening 53 in a vehicle body. A mounting plate 54 projects from the outer circumferential surface of the vehicle-side housing 51, and the vehicle-side housing 51 is mounted and fixed to the mounting opening portion 53 by placing the mounting plate 54 along the opening edge of the mounting opening portion 53 and fixing it.

A fitting tube 55 is provided circumferentially around the outer surface of the housing main body 51A. The fitting tube 55 projects forward from the mounting plate 54, so that the receptacle 13 is fittable between the housing main body 51A and the fitting tube 55. A lock projection 56 is provided on the upper surface of the fitting tube 55 and is engageable in a connecting direction with a lever-side projection 14A projecting from the lower surface of the leading end of the lever 14. Accordingly, when the two connectors 10, 50 are connected, the lever-side projection 14A engages the lock projection 56 so that the two connectors 10, 50 are held together. Note that a bellows-like grommet 57 is mounted on a rear part of the mounting opening 53 and extends back.

Each vehicle-side terminal 60 has a pin-like male-side main portion 61, and a male-side flange 62 projects circumferentially from the outer circumferential surface of this male-side main portion 61. The male-side flange 62 contacts the rear wall of the vehicle-side cavity 52 from behind, and the male-side main portion 61 is accommodated into the vehicle-side cavity 52 through the rear wall. A cylindrical male-side barrel 63 is formed rearward of the male-side main portion 61, and a core of a wire W is placed in the male-side barrel 63 and fixed by crimping, bending or folding. Further, a heat shrinkable tube 58 is mounted to cover the crimping part of the male-side barrel 63 to protect the crimping part of the male-side barrel 63 from water. A vehicle-side retainer 59 is mounted in a rear part of the vehicle-side housing 51 and engages the male-side flanges 62 of the vehicle-side terminals 60 from behind for preventing the vehicle-side terminals 60 from coming out backward.

The terminal fitting 20 includes a female-side main portion 21 with a plurality of contact pieces 23 formed by circumferentially spaced slits that extend back from the front end opening edge of the female-side main portion 21. The terminal of this type is called a slotted terminal in some cases. Further, a female-side flange 22 projects out at a rear end of the outer circumferential surface of the female-side main portion 21. The female-side flange 22 is arranged to face the rear end opening edge of the cavity 17 while being spaced therefrom by a specified distance.

A retainer 27 is mounted behind the receptacle 13 and includes insertion holes through which the respective terminal fittings 20 are inserted. Upper and lower retaining pieces 28 project forward from an inner wall of the insertion hole and engage the corresponding female-side flange 22 from behind. The female-side flange 22 presses the retaining pieces 28 from behind when the terminal fitting 20 is inserted into the cavity 17, and the leading ends of the retaining pieces 28 are displaced out along their pivot paths. The retaining pieces 28 resiliently return when the female-side flange 22 moves beyond the retaining pieces 28 and the leading ends of the retaining pieces 28 displace in along their pivot paths. During returning movements, the leading ends of both retaining pieces 28 move away from the female-side flange 22 along the pivot paths. Therefore tiny clearances are formed between the female-side flange 22 and the leading ends of the retaining pieces 28. Thereafter, when the terminal fitting 20 is pushed back, the leading ends of the retaining pieces 28 contact and engage the female-side flange 22 from behind to prevent a backward movement of the terminal fitting 20.

A seal ring 30 is sandwiched between an inner surface of the cavity 17 at the back wall 16 of the receptacle 13 and the outer circumferential surface of the female-side main portion 21 facing this surface. The seal ring 30 is mounted in a seal groove in the outer circumferential surface of the female-side main portion 21. The seal ring 30 is made of resilient material such as rubber and contains oil or a lubricant. The oil or lubricant makes the seal ring 30 move smoothly on the outer circumferential surface of the female-side main portion 21, and relative movements of the seal ring 30 with respect to the outer circumferential surface of the female-side main portion 21 are prevented by mounting the seal ring 30 into the seal groove. Therefore, the seal ring 30 is sandwiched over the entire circumference between the inner surface of the seal groove and the inner wall of the cavity 17 to provide waterproofing between the inner wall of the cavity 17 and the female-side main portion 21.

A wire connection portion is formed behind the female-side main portion 21 and comprises a barrel 24 to be connected to the core exposed at an end of the wire W. The barrel 24 is cylindrical and is connected electrically conductively to the wire W by being crimped, bent or folded with the core of the wire W accommodated inside. The wire W extends back from the barrel 24 and is drawn out to the outside through the interiors of the connector main body 11 and the grip 12. A preferred wire accommodating portion is formed by inner spaces of the connector main body 11 and the grip 12.

Wires W extend back in correspondence with the terminal fittings 20 and are bundled into one cable W1 by being covered by an outer sheath in the grip 12. The cable W1 is fixed by a cable grip ring (not shown) or the like in the grip 12 and further fixed by a bush 40 at a rear end portion of the grip 12. The bush 40 is held in close contact with the inner circumferential surface of the rear end opening of the grip 12 and the outer circumferential surface of the cable W1 to prevent water from entering the interior of the grip 12 through the rear end of the grip 12. Water drain holes 25A are formed in the lower surfaces of the connector main body 11 and the grip 12 so that water can escape to the outside through the water drain holes 25A even if it enters the interiors of the connector main body 11 and the grip 12.

In a state where the cable W1 is fixed in the grip 12, the wires W are bent in the connector main body 11 and the respective terminal fittings 20 constantly are biased forward toward the vehicle-side connector 50 by reaction forces of the wires W. A force for biasing the terminal fitting 20 forward by the reaction force of the wire W is set to exceed a frictional force of the seal ring 30. Here, the frictional force of the seal ring 30 can be adjusted by an oil or lubricant content amount. As the oil or lubricant content amount of the seal ring 30 increases, the frictional force of the seal ring 30 with the inner wall of the cavity 17 decreases. Accordingly, the frictional force of the seal ring 30 can be set smaller than the reaction force of the wire W by increasing the oil or lubricant content amount of the seal ring 30. Thus, in a state shown in FIG. 3 before the two connectors 10, 50 are connected, the terminal fittings 20 are biased substantially forward by the reaction forces of the wires W against the frictional forces of the seal rings 30 and the front ends of the female-side main portions 21 of the terminal fittings 20 contact the front walls 17A of the cavities 17. On the other hand, the female-side flanges 22 are not in contact with the rear end opening edges of the cavities 17. Therefore, no clearances are formed between the front ends of the female-side main portions 21 and the front walls 17A of the cavities 17 and, hence, there is no likelihood that muddy water enters the clearances.

Figure 4:
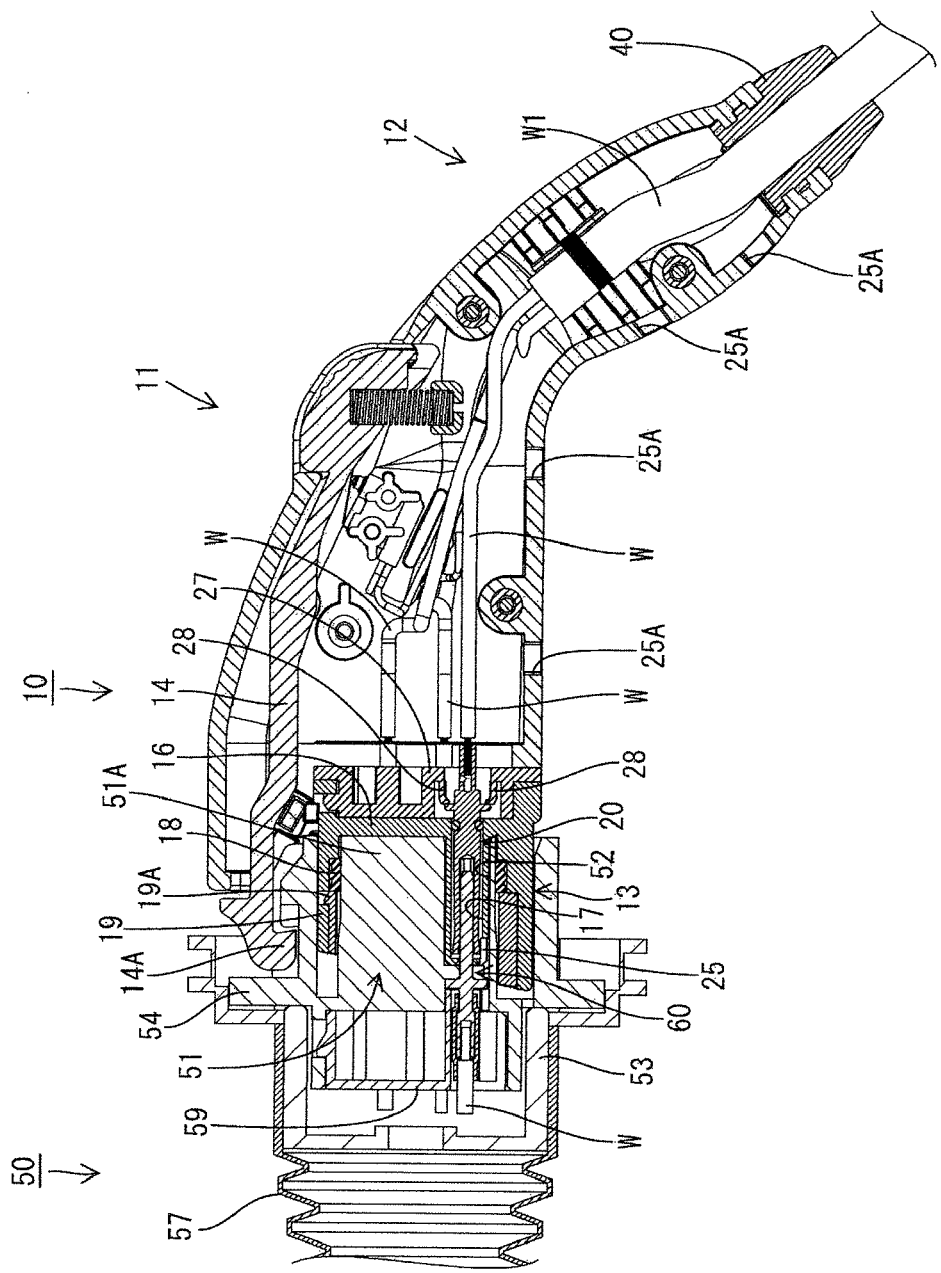
FIG. 4 is a section showing a state where the vehicle-side connector and the charging connector are connected.
Figure 5:
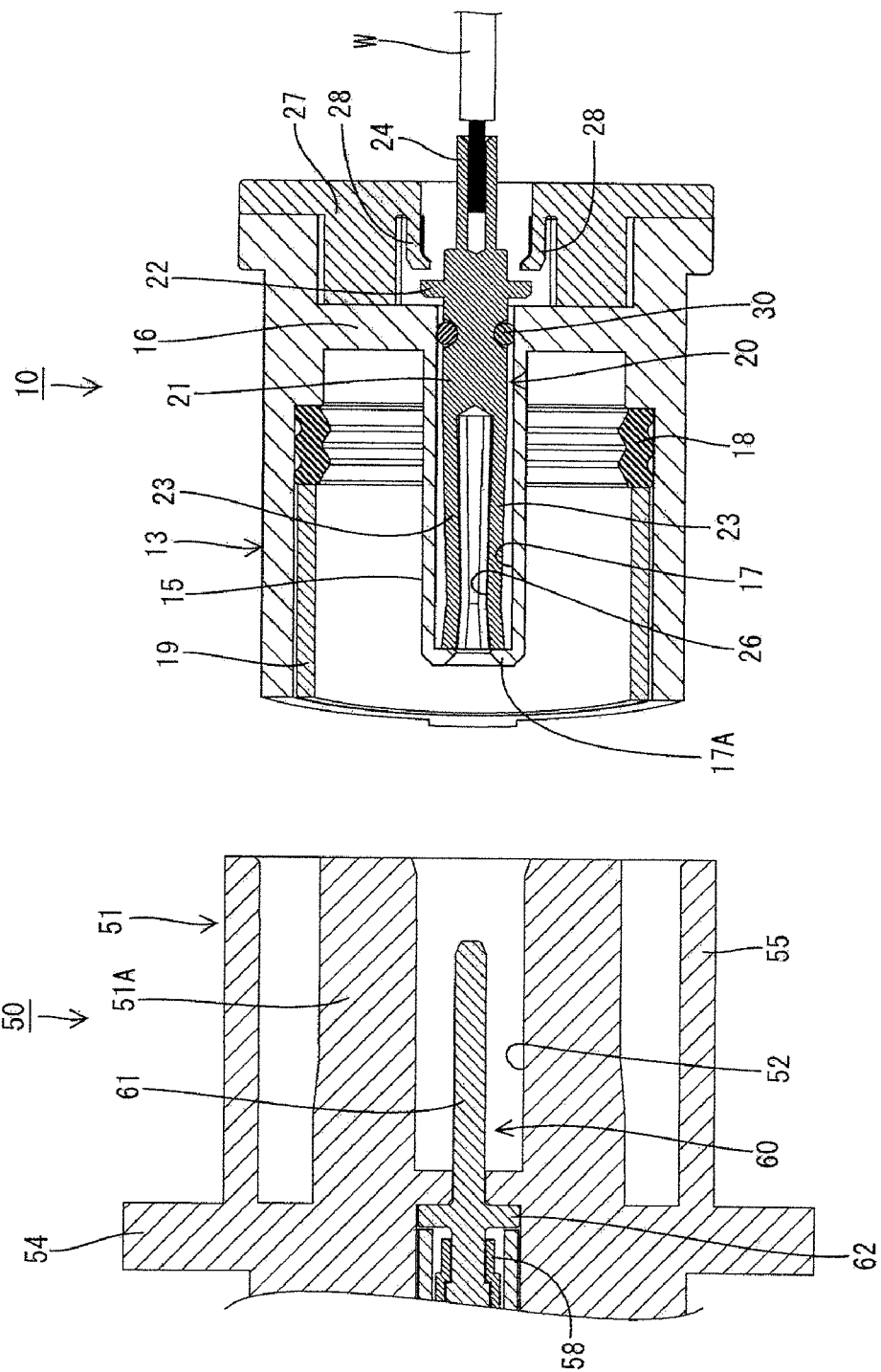
FIG. 5 is an enlarged section simply showing a state before a vehicle-side terminal and a terminal fitting are connected.
Figure 6:
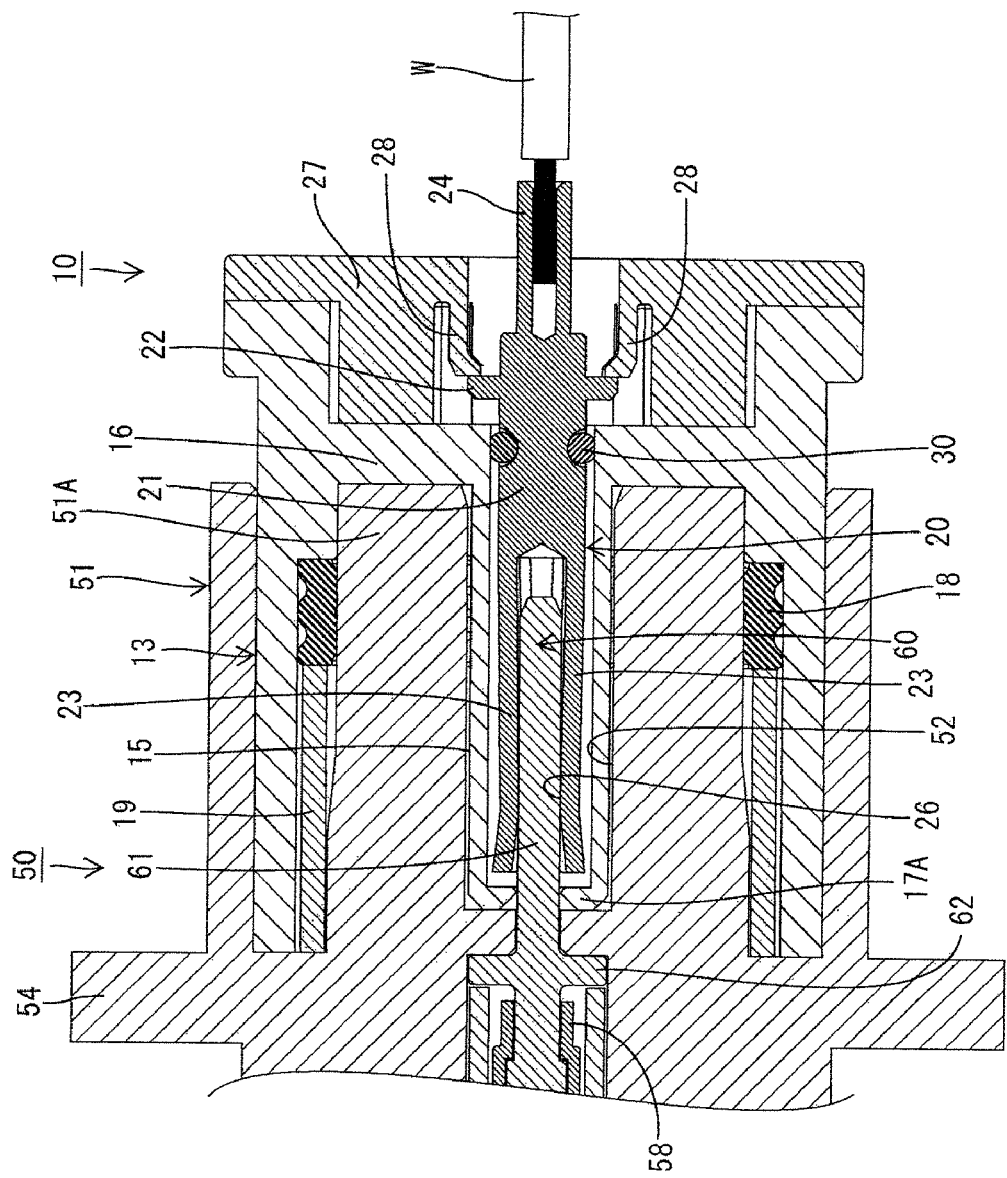
FIG. 6 is an enlarged section simply showing the state where the vehicle-side terminal and the terminal fitting are connected.
Figure 7:
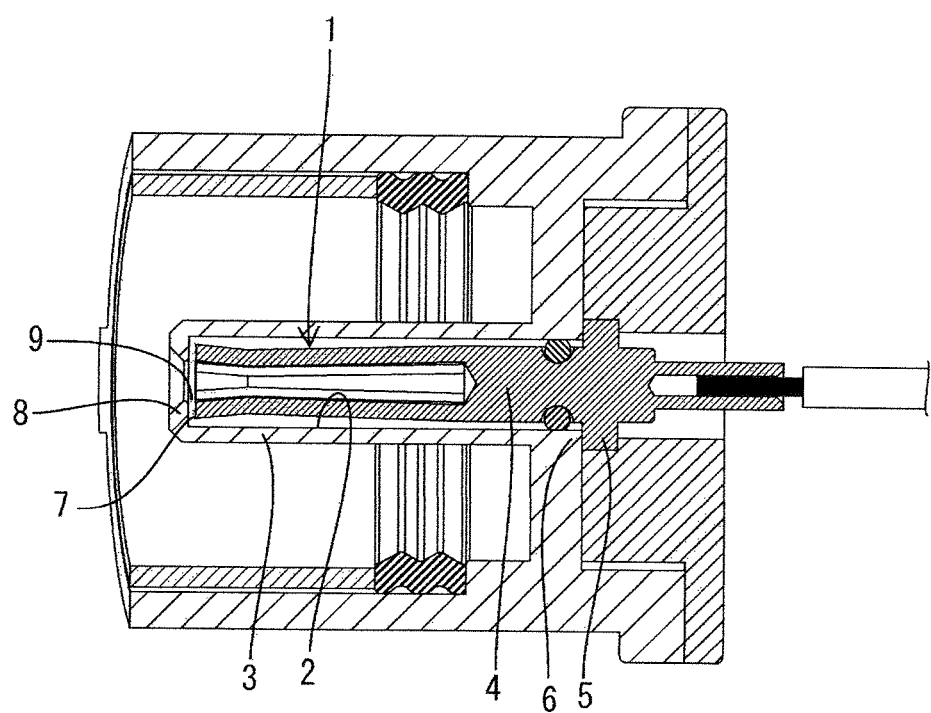
FIG. 7 is a side view showing a conventional charging connector.

FIGS. 5 and 6 are sections enlargedly and simply showing the surrounding of the terminal fitting 20 in FIGS. 3 and 4. As shown in FIG. 5, in a state before connection to the vehicle-side terminal 60, the respective contact pieces 23 of the terminal fitting 20 are formed to moderately approach an axial center from a base end portion toward a leading end portion and then move away from the axial center at the leading end portion. In other words, the contact pieces 23 have a substantially mountain shape with a peak near the axial center of the female-side main portion 21, and at the leading end portion. A contact portion 26 of the terminal fitting 20 is formed by the peaks of contact pieces 23, and an inner diameter in this contact portion 26 is less than an outer diameter of the male-side main portion 61 of the vehicle-side terminal 60. Thus, when the vehicle-side terminal 60 is fit into the terminal fitting 20, the male-side main portion 61 of the vehicle-side terminal 60 and the respective contact pieces 23 slide at the contact portion 26 and the vehicle-side terminal 60 and the terminal fitting 20 are connected electrically conductively with the respective contact pieces 23 resiliently deformed radially outwardly.

A frictional force between the male-side main portion 61 and the contact portion 26 is larger than the reaction force received from the wire W. Thus, the male-side main portion 61 and the respective contact pieces 23 slide at the contact portion 26 and the terminal fitting 20 is pushed back. The wiping effect that occurs when the contact pieces 23 and the male-side main portion 61 slide wipes off any dust or the like should deposit on terminal surfaces.

The terminal fitting 20 can move back and forth between a frontmost position and a rearmost position when being connected to and separated from the vehicle-side terminal 60. The frontmost position is the position of the terminal fitting 20 in a state of FIG. 5 (FIG. 3) where the front end of the female-side main portion 21 and the front wall 17A of the cavity 17 are in contact. The rearmost position is the position of the terminal fitting 20 in a state of FIG. 6 (FIG. 4) where the female-side flange 22 and the retaining pieces 28 are in contact. In other words, the vehicle-side terminals 60 and the terminal fittings 20 are connected as the two connectors 10, 50 are connected, and the terminal fittings 20 can move along the longitudinal direction from frontmost to rearmost positions by frictional forces produced at the contact portions 26. Contrary to this, the vehicle-side terminals 60 are separated from the terminal fittings 20 as the two connectors 10, 50 are separated and the terminal fittings 20 are moved in an opposite direction from the rearmost positions to the frontmost positions by frictional forces produced at the contact portions 26.

The terminal fitting 20 is biased forward by the reaction force of the wire W against the frictional force of the seal ring 30 when at the frontmost position, as shown in FIG. 5. Therefore the front end of the female-side main portion 21 contacts the front wall 17A of the cavity 17. Thus, no substantial clearance is formed between the front end of the female-side main portion 21 and the front wall 17A of the cavity 17 and there is very little likelihood that muddy water enters the clearance. Therefore, connection reliability that can endure a muddy water test can be obtained.

The male-side male portions 61 enter between the corresponding contact pieces 23 when the two connectors 10, 50 are connected and the respective contact pieces 23 are deformed resiliently out so that the male-side male portions 61 and the contact pieces 23 are connected electrically conductively at the contact portions 26. During this time, frictional forces are produced by the contact of the male-side male portions 61 and the respective contact pieces 23, and the terminal fittings 20 are moved rearward by these frictional forces. The female-side flanges 22 contact the leading ends of the corresponding retaining pieces 28 when the terminal fittings 20 reach the rearmost positions, thereby preventing any further backward movements of the terminal fittings 20. If the vehicle-side terminals 60 are connected to the terminal fittings 20, the male-side male portions 61 and the respective contact pieces 23 slide at the contact portions 26 and dust or the like depositing on the terminal surfaces are removed by the wiping effect.

The terminal fittings 20 move forward from the rearmost positions to the frontmost positions by frictional forces at the contact portions 26 when the two connectors 10, 50 are separated. When the terminal fittings 20 reach the frontmost positions, the front ends of the female-side main portions 21 contact the front walls 17A of the cavities 17 before the female-side flanges 22 contact the rear end opening edges of the cavities 17 to prevent any further forward movements of the terminal fittings 20. If the vehicle-side terminals 60 are separated further from the terminal fittings 20, the male-side male portions 61 and the respective contact pieces 23 slide at the contact portions 26 and the respective contact pieces 23 resiliently return when the male-side male portions 61 pass the contact portions 26.

As described above, the terminal fittings 20 are biased forward toward the vehicle-side connector 50 by receiving the reaction forces of the wires W before the two connectors 10, 50 are connected. Thus, the terminal fittings 20 are arranged at the frontmost positions and the front ends of the female-side main portions 21 and the front walls 17A of the cavities 17 are held in contact. Therefore, no clearances are formed between the front ends of the female-side main portions 21 and the front walls 17 of the cavities 17, thereby preventing entrance of muddy water into these clearances. Hence, durability performance that can endure the muddy water test can be obtained.

When the two connectors 10, 50 are connected, the terminal fittings 20 are pushed to the rearmost positions by the frictional forces between the male-side male portions 61 and the respective contact pieces 23 and the female-side flanges 22 contact the corresponding retaining pieces 28 to prevent the terminal fittings 20 from moving any further backward. By sliding movements of the male-side male portions 61 and the contact pieces 23, dust or the like depositing on the terminal surfaces can be removed. Further, since the terminal fittings 20 move back and forth between the frontmost positions and the rearmost positions, the retaining pieces 28 can be deformed resiliently and restored while the leading ends thereof are displaced along their pivot paths.

The invention is not limited to the above described and illustrated embodiment. For example, the following embodiments are also included in the scope of the invention.

Although the terminal fitting 20 is movable back and forth between the frontmost position and the rearmost position in the above embodiment, it may substantially not be moved in forward and backward directions according to the present invention. In other words, the frontmost and rearmost positions may be the same position.

Although the retaining pieces are illustrated as a retaining portion in the above embodiment, a side retainer or the like may be used as the retaining portion.

Although so-called slotted terminals are illustrated as the terminal fittings in the above embodiment, the terminal fittings may be such that a resilient contact piece is formed in a (particularly substantially rectangular or polygonal) tube portion according to the present invention.

What is claimed is:

1. A charging connector connectable to a vehicle-side connector provided at a vehicle, comprising:
    a terminal fitting including a main portion connectable to a vehicle-side terminal provided in the vehicle-side connector and having an end of a wire connected to the main portion;
    a terminal accommodating portion internally formed with a cavity for at least partly accommodating the terminal fitting;
    a seal member able to seal the terminal fitting; and
    a wire accommodating portion provided behind the terminal accommodating portion for accommodating the wire in a state where a reaction force capable of pushing the terminal fitting forward is produced,
    wherein the terminal fitting is biased constantly forward by the reaction force of the wire against a frictional force with the seal member.

2. The charging connector of claim 1, wherein the seal member is sandwiched between facing surfaces of an inner wall of the cavity and the main portion to seal between the facing surfaces over the entire circumference.

3. The charging connector of claim 1, wherein the terminal fitting is biased constantly forward by the reaction force of the wire against a frictional force with the seal member causes the terminal fitting to be arranged at a frontmost position where the front end of the main portion and the front wall of the cavity facing the front end of the main portion are substantially in contact.

4. The charging connector of claim 1, further comprising a retainer behind the terminal accommodating portion for retaining the terminal fitting in the cavity by engaging from behind with a flange projecting out from the main portion of the terminal fitting.

5. The charging connector of claim 4, wherein, in a state where the vehicle-side terminal is fit in the main portion, the terminal fitting is at a rearmost position where the flange and the retaining portion are engaged.

6. The charging connector of claim 1, wherein:
    the main portion includes at least one contact piece that resiliently contacts the vehicle-side terminal; and
    the vehicle-side terminal and the contact piece slide as the vehicle-side terminal and the main portion are connected and separated.

7. The charging connector of claim 1, wherein the terminal fitting is movable back and forth between the frontmost position and the rearmost position while being connected to and separated from the vehicle-side terminal.

8. The charging connector of claim 1, wherein a frictional force between the vehicle-side terminal and the main portion is larger than the reaction force received from the wire.

9. The charging connector of claim 1, wherein the frictional force of the seal member is adjusted by an oil or lubricant content amount thereof.

* * * * *